United States Patent
Feldner et al.

(10) Patent No.: US 10,843,582 B2
(45) Date of Patent: Nov. 24, 2020

(54) PLUG CONNECTOR PART WITH AN INLET PART TO BE CONNECTED TO A HOUSING PART

(71) Applicant: PHOENIX CONTACT E-Mobility GmbH, Schieder-Schwalenberg (DE)

(72) Inventors: Ralf Feldner, Horn-Bad Meinberg (DE); Carsten Garth, Lemgo (DE); Kai Schlueter, Luegde (DE)

(73) Assignee: PHOENIX CONTACT E-MOBILITY GMBH, Schieder-Schwalenberg (DE)

( * ) Notice: Subject to any disclaimer, the term of this patent is extended or adjusted under 35 U.S.C. 154(b) by 0 days.

(21) Appl. No.: 16/594,118

(22) Filed: Oct. 7, 2019

(65) Prior Publication Data
US 2020/0108727 A1    Apr. 9, 2020

(30) Foreign Application Priority Data
Oct. 9, 2018 (DE) .......................... 10 2018 124 821

(51) Int. Cl.
*B60L 53/16* (2019.01)
*H01R 13/627* (2006.01)

(52) U.S. Cl.
CPC .......... *B60L 53/16* (2019.02); *H01R 13/6275* (2013.01); *H01R 2201/26* (2013.01)

(58) Field of Classification Search
CPC ....................................................... B60L 53/16
See application file for complete search history.

(56) References Cited

U.S. PATENT DOCUMENTS

| | | | |
|---|---|---|---|
| 9,233,615 B2 | 1/2016 | Matsuda et al. | |
| 10,179,517 B2 | 1/2019 | Toth | |
| 2011/0045701 A1 | 2/2011 | Tsuruta | |
| 2016/0118742 A1 | 4/2016 | Akagi et al. | |
| 2018/0287311 A1* | 10/2018 | Houry | H01R 13/621 |

FOREIGN PATENT DOCUMENTS

| | | |
|---|---|---|
| DE | 9014856 U1 | 1/1991 |
| DE | 102004018103 B3 | 9/2005 |
| DE | 202009011568 U1 | 3/2010 |
| DE | 102011004834 A1 | 8/2012 |
| EP | 2525443 A1 | 11/2012 |
| WO | WO 2014053221 A1 | 4/2014 |

* cited by examiner

*Primary Examiner* — Ross N Gushi
(74) *Attorney, Agent, or Firm* — Leydig, Voit & Mayer, Ltd.

(57) ABSTRACT

A plug connector part for connecting to a mating plug connector part includes: a housing part; an inlet part that is connectable to the housing part, the inlet part having a plug section on which at least one contact element is arrangeable for a plug-in connection to the mating plug connector part; and a locking frame having at least one first latching element, the locking frame being latched in a first mounting position to the inlet part via the at least one first latching element in order to attach the inlet part together with the locking frame to the housing part. The inlet part in a position attached to the housing part is connected in a positive-locking manner to the housing part via at least one second latching element. The locking frame is movable from the first mounting position relative to the inlet part to a second mounting position.

14 Claims, 6 Drawing Sheets

FIG 7B
(Detail B)

FIG 7C
(Detail C)

FIG 8A

FIG 8B
(Detail E)

PLUG CONNECTOR PART WITH AN INLET PART TO BE CONNECTED TO A HOUSING PART

CROSS-REFERENCE TO PRIOR APPLICATION

Priority is claimed to German Patent Application No. DE 10 2018 124 821.0, filed on Oct. 9, 2018, the entire disclosure of which is hereby incorporated by reference herein.

FIELD

The invention relates to a plug connector part for connecting to a mating plug connector part.

BACKGROUND

Such a plug connector part comprises a housing part and an inlet part to be connected to the housing part, the inlet part having a plug section on which at least one (electrical) contact element can be arranged for a plug-in connection to the mating plug connector part.

Such a plug connector part can be used, for example, as a charging plug or a charging socket for charging an electrically driven vehicle (also referred to as an electric vehicle). Such a charging socket is arranged, for example, on a vehicle and can be connected by mating with an assigned mating plug connector part in the form of a charging plug on a cable connected to a charging station in order to thus establish an electrical connection between the charging station and the vehicle.

Especially in the case of charging sockets, also referred to as "inlets," to be arranged on the part of a vehicle, a variable design of a housing part visible from the outside for different vehicles according to the wishes of a vehicle manufacturer is usually provided. However, an inlet part that forms the plug section with the electrical contact elements arranged thereon is usually standardized with a view to its mating face. Given that housing parts are designed differently for different vehicles, it is difficult with previous approaches to use common parts for the design of the plug connector part, because the inlet part usually also has to be adapted for fastening to the housing part (which is variable depending on the vehicle).

As described in WO 2014/053221 A1, vehicles with an electric drive may require charging devices with different configurations. Such a requirement arises, for example, from different country-specific standards with regard to charging stations or different vehicle systems. In accordance with the technology described in WO 2014/053221 A1, a charging device is formed as a modular system. In this case, a middle module that is universally usable is provided for mounting on the vehicle. This middle module has an interface on both the input and output sides for attaching an end module that can be selected from different modules.

DE 10 2011 004 834 A1 describes a charging device for an electric vehicle with an adapter plate to attach a standardized electrical component to different vehicle bodies.

SUMMARY

In an embodiment, the present invention provides a plug connector part for connecting to a mating plug connector part, comprising: a housing part; an inlet part that is connectable to the housing part, the inlet part having a plug section on which at least one contact element is arrangeable for a plug-in connection to the mating plug connector part; and a locking frame having at least one first latching element, the locking frame being latched in a first mounting position to the inlet part via the at least one first latching element in order to attach the inlet part together with the locking frame to the housing part, wherein the inlet part in a position attached to the housing part is connected in a positive-locking manner to the housing part via at least one second latching element, wherein the locking frame is movable from the first mounting position relative to the inlet part to a second mounting position in order to act on the at least one second latching element in the position of the inlet part attached to the housing part such that the positive-locking connection between the inlet part and the housing part is secured against releasing in the second mounting position of the locking frame.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides a plug connector part and a method for mounting a plug connector part, which enable the use of a uniform inlet part together with variably designed different housing parts, and to provide an interface for fastening such a uniform inlet part to different housing parts.

Accordingly, the plug connector part comprises a locking frame having at least one first latching element. In a first mounting position, the locking frame is latched to the inlet part via the at least one first latching element in order to attach the inlet part together with the locking frame to the housing part. In a position attached to the housing part, the inlet part is connected in a positive-locking manner to the housing part via at least one second latching element. The locking frame can be moved from the first mounting position relative to the inlet part to a second mounting position in order to act on the at least one second latching element in the position of the inlet part attached to the housing part in such a manner that the positive-locking connection between the inlet part and the housing part is secured against releasing in the second mounting position of the locking frame.

In order to connect the inlet part to the housing part, it is thus proposed to use a locking frame that is arranged on the inlet part and is movable relative to the inlet part in order to be able to initially attach the inlet part, with the locking frame in the first mounting position, to the housing part and then to establish a secure, fixed connection between the inlet part and the housing part by moving the locking frame from the first mounting position to the second mounting position. The locking frame is arranged on the inlet part and is attached to the housing part together with the inlet part. When the inlet part has been attached to the housing part, the locking frame is moved relative to the housing part in order to secure the positive-locking connection between the inlet part and the housing part.

The inlet part forms a positive-locking connection with the housing part when the inlet part is attached to the housing part. This positive-locking connection is established by at least one second, elastically deflectable latching element that, when the inlet part is attached to the housing part, latches in such a manner that the inlet part is connected in a positive-locking manner to the housing part. If the locking frame is in the first mounting position on the inlet part, such elastic deflection of the at least one second latching element is possible so that the positive-locking connection between the inlet part and the housing part can be established by attaching the inlet part.

When the inlet part has been attached to the housing part and the locking frame is moved from its first mounting position to the second mounting position relative to the inlet part, the locking frame interacts with the at least one second latching element in such a manner that an elastic deflection of the second latching element is blocked. The positive-locking connection between the inlet part and the housing part is thus secured, because the at least one second locking element is blocked in its assumed position by the locking frame.

In one embodiment, the locking frame has a body element on which the at least one first latching element is arranged and which extends circumferentially around the inlet part at least in sections. The body element thus circumferentially encloses the inlet part at least partially and carries one or more first latching elements, through which the locking frame is latched to the inlet part in the first mounting position. In the first mounting position, the locking frame is thus held on the inlet part and can be attached to the housing part together with the inlet part.

In one embodiment, the body element is formed to act on the at least one second latching element in the second mounting position of the locking frame in order to thus secure the positive-locking connection between the inlet part and the housing part. With the body element extending circumferentially around the inlet part, the locking frame thus acts on the at least one second latching element when the locking frame has been moved into its second mounting position relative to the inlet part so that elastic deflection of the at least one second latching element is blocked and the positive-locking connection between the inlet part and the housing part is thus secured against releasing.

The at least one second latching element can be arranged, for example, on the housing part. The at least one second latching element can, for example, be extended from a bottom section of the housing part in the manner of a latching finger, and can be deflected elastically in such a manner that, when the inlet part is attached to the housing part, a positive-locking connection can be established between the inlet part and the housing part through the at least one second latching element.

In this case, it may be provided that when the inlet part is attached to the housing part, the at least one second latching element is automatically deflected by interaction with the inlet part. Thus, separate actuation of the at least one second latching element is not necessary. When the inlet part is attached to the housing part, the at least one second latching element is deflected and snaps into positive-locking engagement with the inlet part when the attached position is reached.

The positive-locking connection between the inlet part and the housing part can be established in this case by the at least one second latching element arranged on the housing part engaging in an assigned latching device of the inlet part when the inlet part is attached to the housing part. The latching device can be formed, for example, by a latching recess in the form of a depression on the inlet part, with which the at least one second latching element engages when the inlet part is attached to the housing part so that, through this, the inlet part is connected in a positive-locking manner to the housing part. In the second mounting position, the locking frame thereby acts on the at least one second latching element in such a manner that the at least one second latching element cannot be released from its latching engagement with the latching device of the inlet part.

In one embodiment, the locking frame can be attached to the inlet part in a first mounting direction in order to latch the locking frame to the inlet part in the first mounting position. In order to mount the plug connector part, the locking frame is thus initially attached to the inlet part, wherein this takes place in a first mounting direction. In the first mounting direction, the locking frame with its body element is, for example, attached to the inlet part in such a manner that the body element encompasses the inlet part circumferentially.

When the inlet part has been attached to the housing part together with the locking frame, the locking frame in one embodiment can be moved from the first mounting position in a second mounting direction opposite to the first mounting direction relative to the inlet part in order to thus transfer the locking frame to the second mounting position. The transfer of the locking frame to the second mounting position thus takes place in a second mounting direction opposite to the first mounting direction. In the second mounting position, the locking frame then acts on the at least one second latching element in such a manner that the positive-locking connection between the inlet part and the housing part is secured, and the inlet part thus cannot be released from the housing part without further action, at least not without actuating the locking frame to move the locking frame out of the second mounting position.

In one embodiment, the locking frame has at least one stop element that, in the second mounting position, is in contact with a stop contour of the inlet part. Together with the stop contour, the at least one stop element defines the second mounting position in such a manner that, when the locking frame is transferred from the first mounting position in the direction of the second mounting position, the at least one stop element comes into contact with the stop contour and the locking frame thus cannot be moved beyond the second mounting position to the inlet part. When the locking frame is transferred from the first mounting position to the second mounting position relative to the inlet part, the at least one stop element is brought closer to the stop contour and in the second mounting direction comes into contact with the stop contour when the second mounting position is reached.

In the first mounting position, the locking frame is latched via the at least one first latching element to the inlet part, preferably to a first latching insert of the inlet part in the form of a latching recess or the like, such that the locking frame is held in position relative to the inlet part when the inlet part is attached to the housing part. When the locking frame is then transferred from its first mounting position to the second mounting position when the inlet part has been attached to the housing part, it may be advantageously provided that the locking frame is latched to the inlet part via the at least one first latching element in the second mounting position as well, and is thus locked to the inlet part in the second mounting position. For this purpose, the at least one first latching element can, in the second mounting position, engage, for example in a latching manner, with a second latching insert of the inlet part that is offset in the second mounting direction, for example in the form of a latching recess, so that there is also a positive connection between the locking frame and the inlet part in the second mounting position. Thus, the locking frame cannot be moved out of the second mounting position without further action, at least not without releasing the positive connection, so that the locking frame cannot be actuated without further action, at least not unintentionally, and the connection between the inlet part and the housing part is thus reliably secured.

In one embodiment, the housing part has a receiving opening into which the inlet part is to be inserted for connecting to the housing part. In this case, the inlet part can be inserted into the receiving opening on a first side of the housing part in such a manner that the plug section of the inlet part is accessible on a second side of the housing part and can be connected by mating with an assigned mating plug connector part on the second side of the housing part. For example, the first side may correspond to an inner side facing inward when the housing part is used as intended, while the second side corresponds to an outer side accessible from outside. Thus, the inlet part is attached to the housing part at the rear of an outer side of the housing part. When the inlet part has been attached to the housing part, the mating face of the inlet part formed by the plug section is thus accessible from the outside so that a mating plug connector part can be attached to the plug connector part from the outside.

The plug connector part can be, for example, a part of a charging system for charging an electric vehicle. In particular, the plug connector part can in this case implement a charging socket on the part of a vehicle into which can be plugged a charging plug, which is connected, for example, via a charging cable to a charging station in order to establish an electrical connection between the charging station and the electric vehicle and to charge the electric vehicle. The housing part can in this case be designed variably, while the inlet part to be connected to the housing part can be attached as a common part to different housing parts.

The task is also achieved by a method of mounting a plug connector part for connecting to a mating plug connector part, in which an inlet part having a plug section on which at least one contact element can be arranged for a plug-in connection to the mating plug connector part, is connected to a housing part. It is in this case provided that the inlet part is attached to the housing part together with a locking frame, which has at least one first latching element and, in a first mounting position, is latched to the inlet part via the at least one first latching element, in such a manner that, in a position attached to the housing part, the inlet part is connected in a positive-locking manner to the housing part via at least one second latching element. The locking frame is then moved from the first mounting position relative to the inlet part to a second mounting position so that the locking frame acts on the at least one second latching element in the position of the inlet part attached to the housing part in such a manner that the positive-locking connection between the inlet part and the housing part in the second mounting position of the locking frame is secured against releasing.

The advantages and advantageous embodiments described above for the plug connector part also apply analogously to the method so that reference is to be made to the above statements in this regard.

Figure 1:
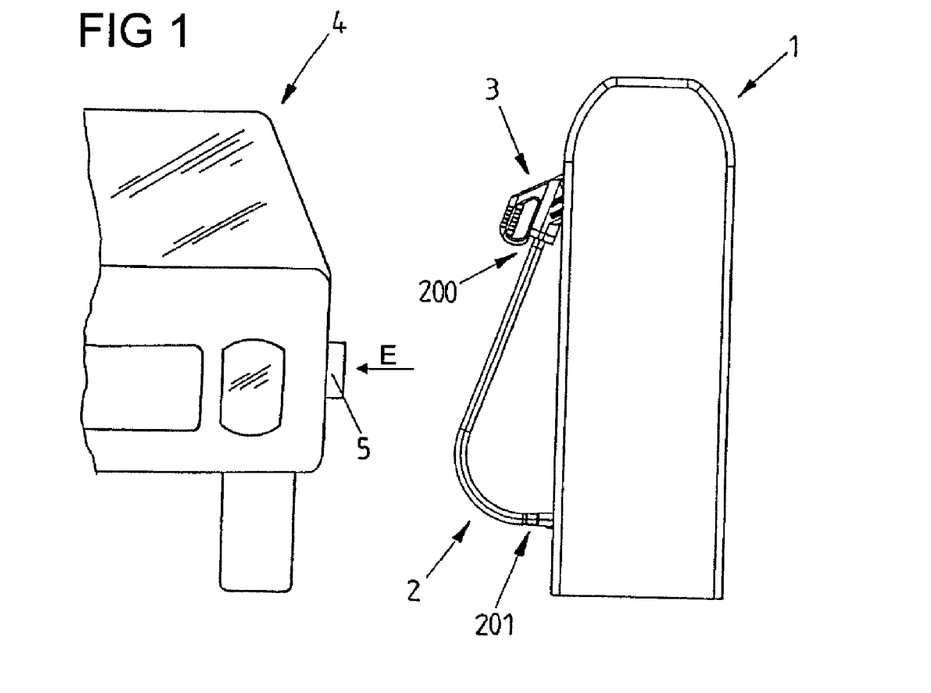
FIG. 1 shows a view of a charging station with a cable arranged thereon.

FIG. 1 shows a charging station 1 used to charge an electrically powered vehicle 4, also referred to as an electric vehicle. The charging station 1 is designed to provide a charging current in the form of an alternating current or a direct current and has a cable 2 that is connected at one end 201 to the charging station 1 and at another end 200 to a mating plug connector part 3 in the form of a charging plug.

The mating plug connector part 3 can be mated with an assigned plug connector part 5 in the form of a charging socket on vehicle 4. In this manner, the charging station 1 can be electrically connected to the vehicle 4 in order to transfer charging currents from the charging station 1 to the vehicle 4.

Figure 2:
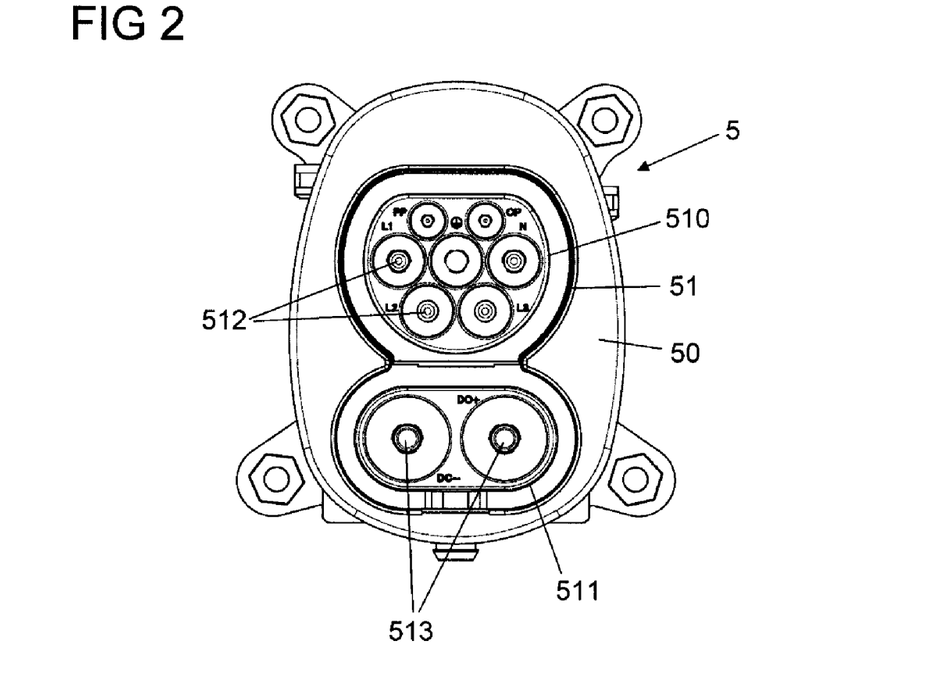
FIG. 2 shows a view of a plug connector part in the form of a charging socket to be attached to a vehicle.

FIG. 2 shows one exemplary embodiment of a plug connector part 5 in the form of a charging socket to be arranged on a vehicle 4, for example. The plug connector part 5 in the form of the charging socket has a housing part 50 on which an inlet part 51 is arranged to form a mating face. The inlet part 51 forms plug sections 510, 511 that can be connected by mating along a plug-in direction E (see FIG. 1) with an assigned mating plug connector part 3 in order to electrically contact electrical contacts 512, 513 at the plug sections 510, 511 with the mating plug connector part 3 and to establish an electrical connection between the charging station 1 and the vehicle 4 through them.

In the exemplary embodiment shown, electrical contact elements 512 are arranged on an upper, first plug section 510 and can be used in particular to transfer a charging current in the form of a (possibly multiphase) alternating current. In contrast, contact elements 513, through which a charging current in the form of a direct current can be transferred to the vehicle 4, are arranged on a lower, second plug section 511. In addition to load contacts for transferring a charging current, signal contacts for transferring control signals can also be provided at the plug sections 510, 511.

In the case of a plug connector part 5 in the form of a charging socket to be arranged on a vehicle 4, as illustrated in FIG. 2 by way of example, the housing part 50 is usually variable in its shape for different vehicles. The mating face provided by the inlet part 51, on the other hand, is standardized so that the plug connector part 5 can be brought into engagement with an appropriately standardized, complementary charging plug 3 in order to charge the vehicle 4.

In order to mount the plug connector part 5, the inlet part 51 must be attached to the housing part 50, wherein it is desirable to use a predefined interface for connection so that a common part that can be connected to differently designed housing parts 50 can be used as inlet part 51. This makes it possible to use a uniform inlet part 51 on completely different housing parts 50, which reduces the variety of parts and also reduces the effort and costs involved in designing a plug connector part 5, because adaptations to the inlet part 51 are no longer necessary.

In order to connect the inlet part 51 to a housing part 50, a locking frame 52 is provided in the exemplary embodiment shown in FIGS. 3 to 8A, 8B in different states during mounting and serves to secure a positive-locking connection between the inlet part 51 and the housing part 50.

Figure 3:
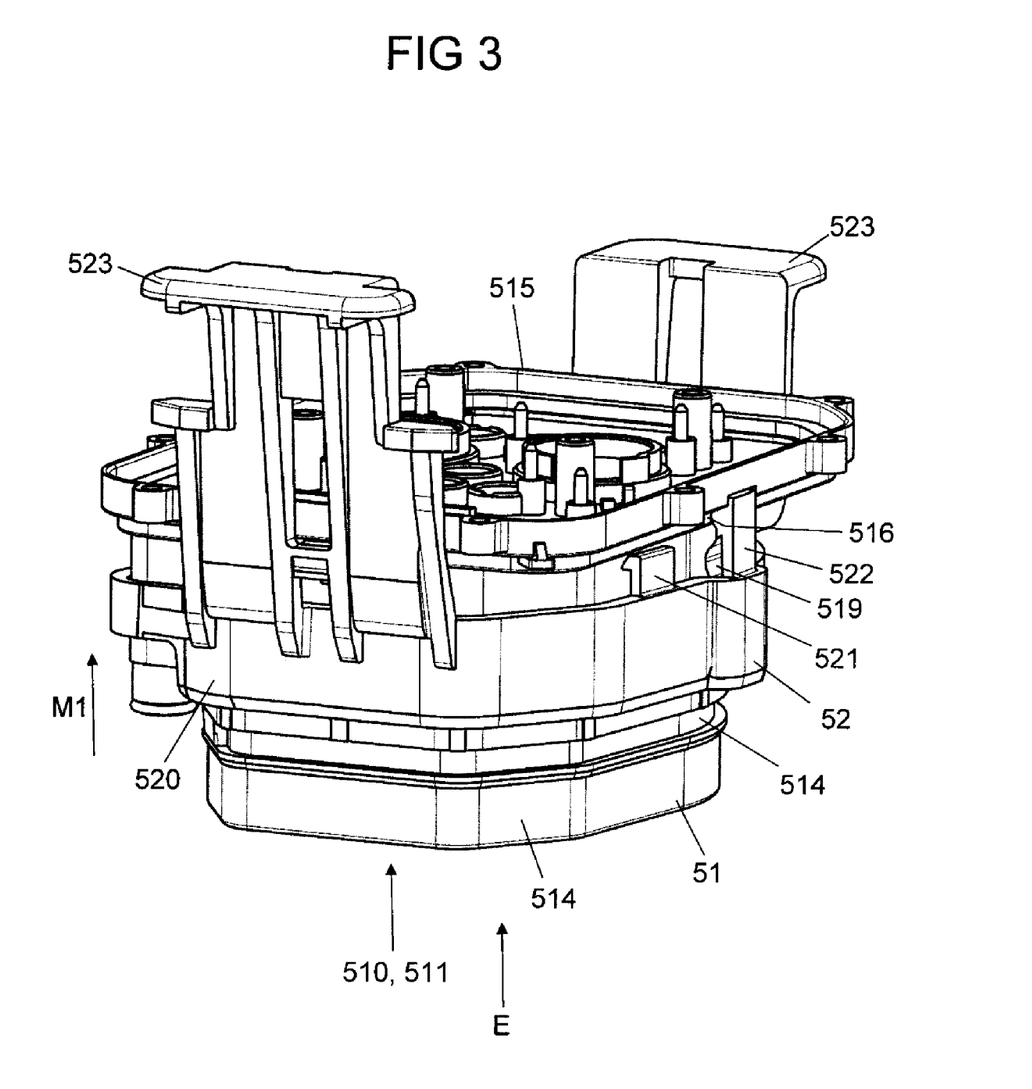
FIG. 3 shows a view of an inlet part of a plug connector part together with a locking frame arranged thereon before attaching the inlet part to a housing part of the plug connector part.

In order to mount the plug connector part 5, the locking frame 52 is attached to the inlet part 51 in a first work step, shown in FIG. 3, in a first mounting direction M1. The locking frame 52 has a body element 520 that, in the position of the locking frame 52 attached to the inlet part 51, extends circumferentially around an inlet housing 514 of the inlet part 51 and thus encompasses the inlet housing 514 on the outside. On the body element 520, latching elements 522 are arranged in the form of latching fingers projecting along the first mounting direction M1 from the body element 520 and, in a first mounting position of the locking frame 52 shown in FIG. 3, are positively engaged with latching inserts 516 on both sides in the region of a housing section 515 in the form of a circumferential edge on the inlet housing 514 (in this respect, see also FIG. 3 in conjunction with FIGS. 7A-7C).

Figure 4:
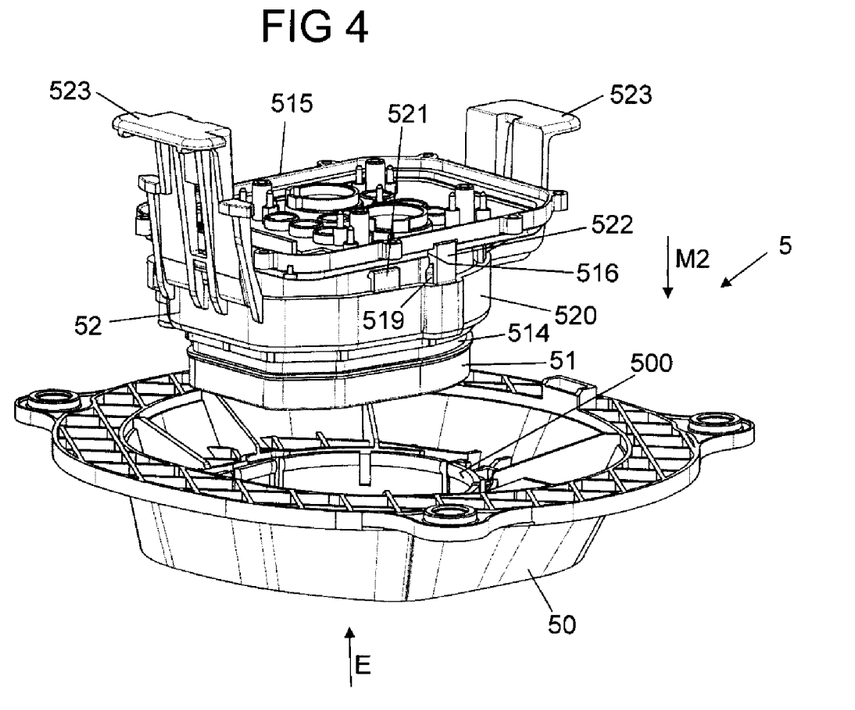
FIG. 4 shows a view of the inlet part during attachment to an assigned housing part.
Figure 5:
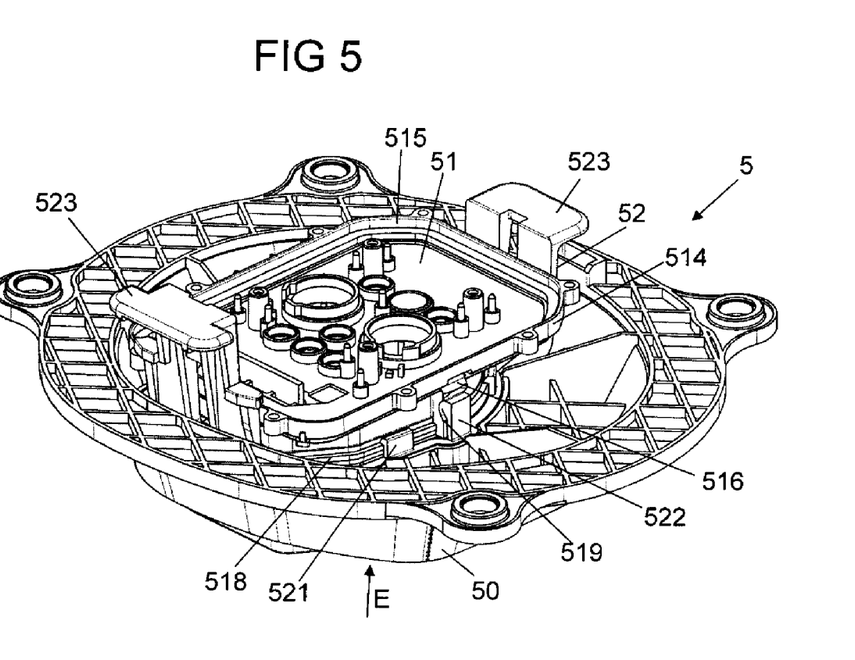
FIG. 5 shows a view of the inlet part in a position attached to the housing part, after actuating the locking frame in order to transfer the locking frame from a first mounting position to a second mounting position.
Figure 6:
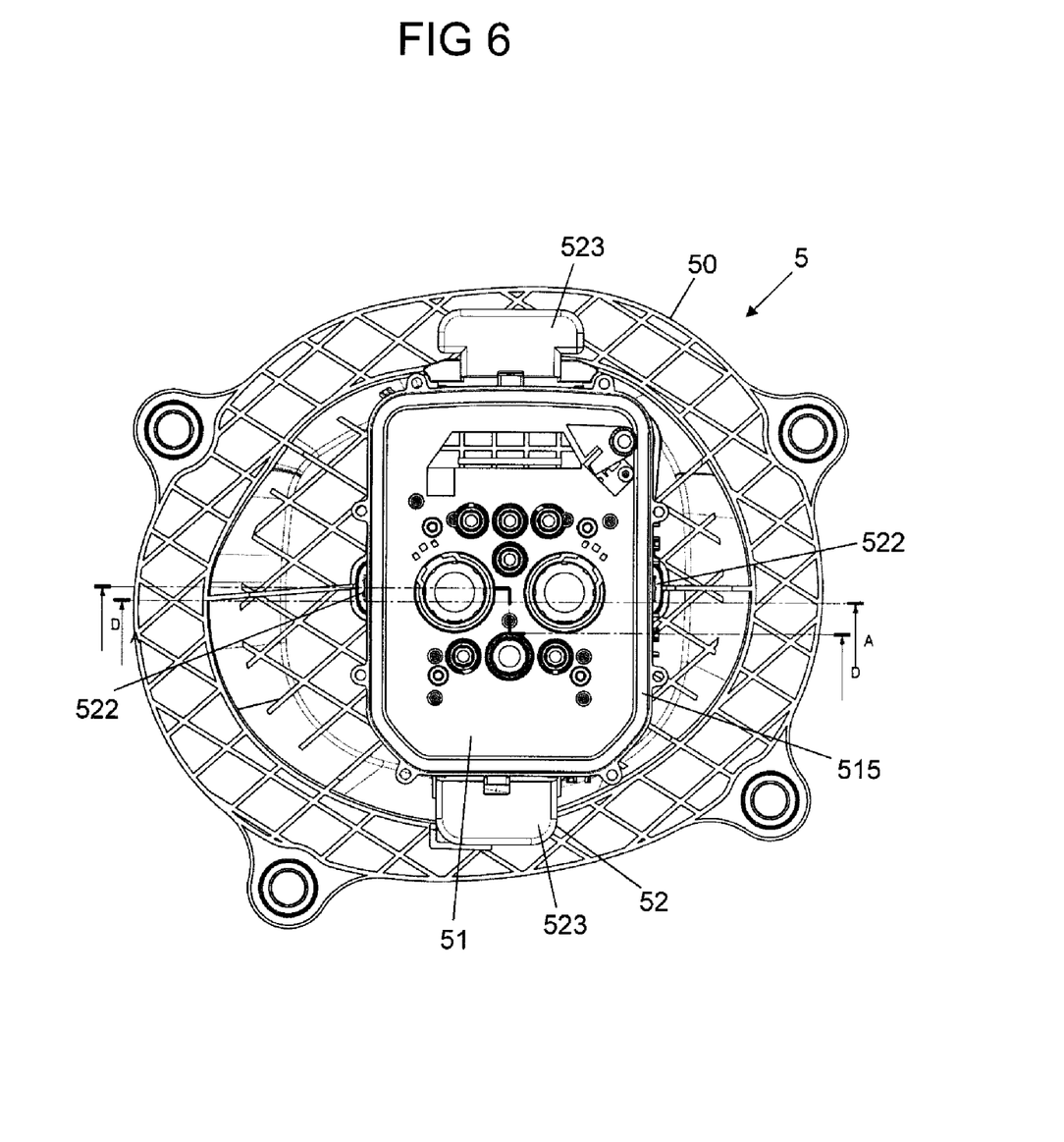
FIG. 6 shows a top view of the plug connector part.

With the locking frame 52 in the first mounting position, the inlet part 51, as shown in the transition from FIG. 4 to FIG. 5, can be attached to the housing part 50 in a next work step by inserting the inlet part 51 with its inlet housing 514 into a receiving opening 500 in the housing part 50. This takes place in a second mounting direction M2 opposite to the first mounting direction M1, with the locking frame 52 held in a positive-locking manner on the inlet part 51 via the latching elements 522.

Figure 7A:
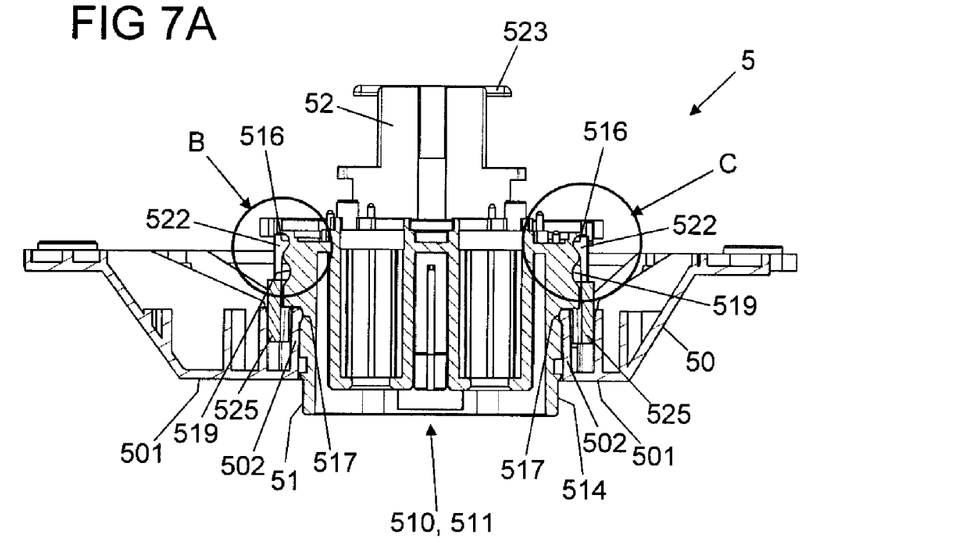
FIG. 7A shows a sectional view along line A-A according to FIG. 6, before actuating the locking frame in order to transfer the locking frame from a first mounting position to a second mounting position.
Figure 7B:
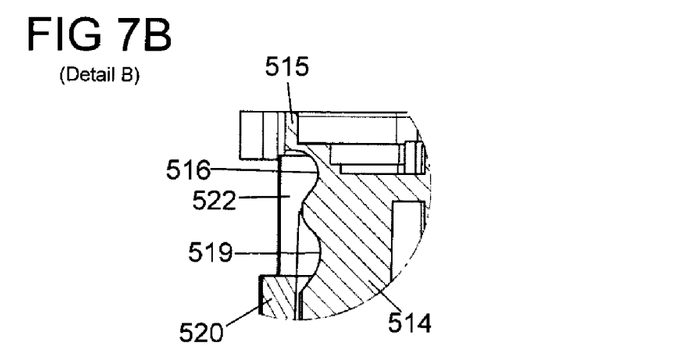
FIG. 7B shows an enlarged view in a cutout B according to FIG. 7A.
Figure 7C:
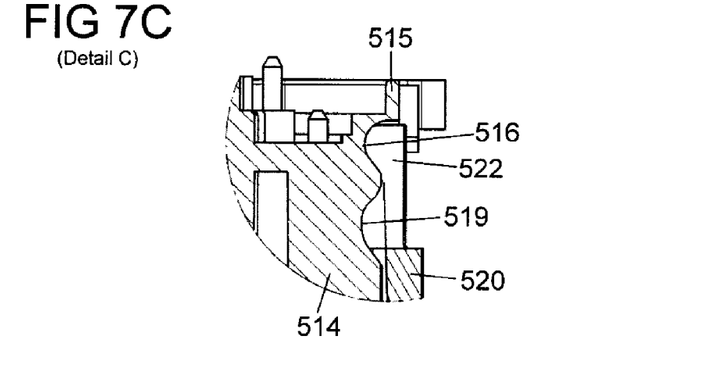
FIG. 7C shows an enlarged view in a cutout C according to FIG. 7A.

When inserting the inlet part 51 into the receiving opening 500 of the housing part 50, latching elements 502 projecting from a bottom section 501 of the housing part 50 engage in a positive-locking manner with latching devices 517 in the form of recesses on the outside of the inlet housing 514, as shown in the sectional view in FIG. 7A. The inlet part 51 is thus connected in a positive-locking manner to the housing part 50 via the latching elements 502 of the housing part 50, wherein the latching elements 502 are elastically deflected outward when the inlet part 51 is inserted through interaction with the inlet housing 514 until they snap elastically into engagement with the latching devices 517 in the form of the recesses on both sides of the inlet housing 514, as shown in FIG. 7A.

When the inlet part 51 is attached to the housing part 50, the locking frame 52 is in the first mounting position, in which the locking frame 52 is held in a positive-locking manner on the inlet part 51 via its latching elements 522 by engaging in the latching inserts 516 in the region of the upper housing section 515. In this first mounting position, a lower edge section 525 of the body element 520 of the locking frame 52 is located in the region of the latching devices 517 of the inlet housing 514 and has such a clear distance to the latching devices 517 that, when the inlet part 51 is attached to the housing part 50, the latching elements 502 of the housing part 50 can be elastically deflected outward and brought into engagement with the latching devices 517.

Figure 8A:
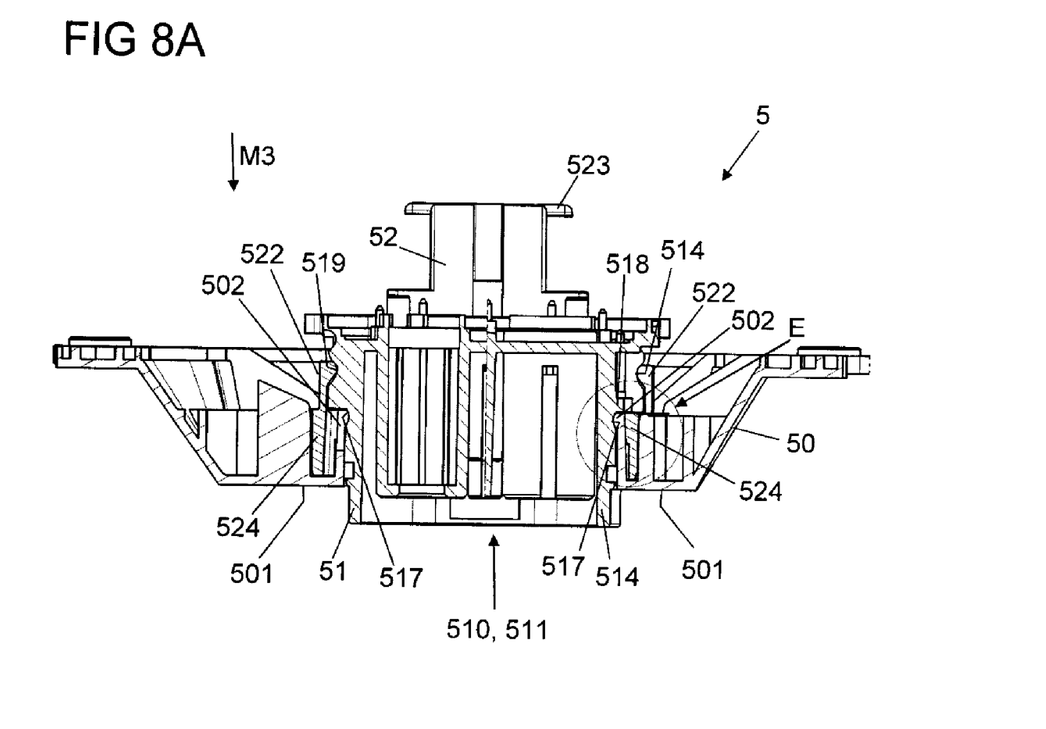
FIG. 8A shows a sectional view along line D-D according to FIG. 6, after actuating the locking frame in order to transfer the locking frame from a first mounting position to a second mounting position.
Figure 8B:
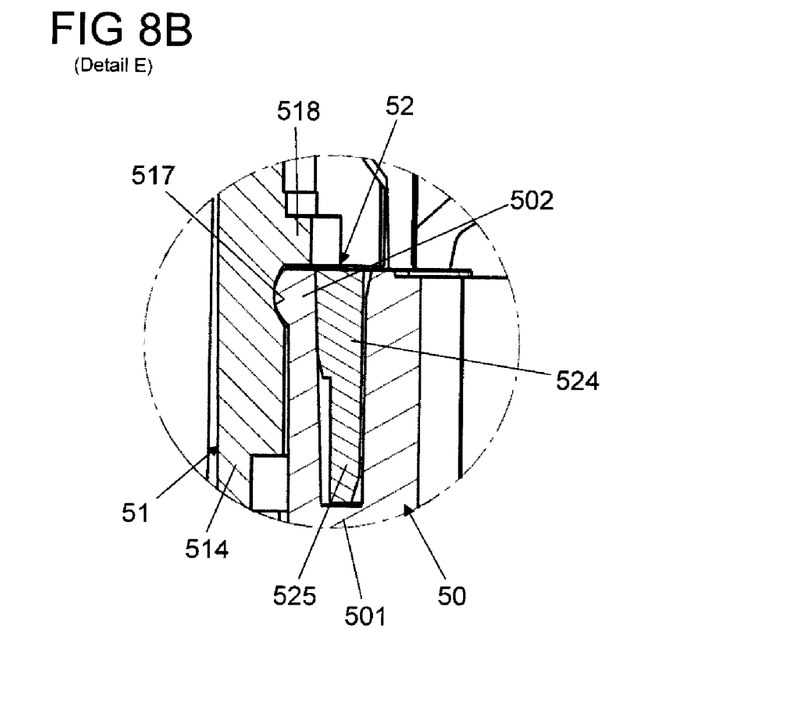
FIG. 8B shows an enlarged view in a cutout E according to FIG. 8A.

If the inlet part 51 has been attached to the housing part 50, a fitter may press the locking frame 52 via actuating elements 523 in the form of flange sections projecting from the body element 520 in order to move the locking frame 52 in a mounting direction M3 (opposite to the first mounting direction M1) from the first mounting position to a second mounting position, as shown in 8A and 8B.

In the second mounting position, the latching elements 522 of the locking frame 52 engage with latching inserts 519 on the inlet housing 514 so that, in turn, the locking frame 52 engages with the inlet part 51 and is thus locked in its second mounting position.

The engagement of the latching elements 522 with the latching inserts 516 in the first mounting position and with the latching inserts 519 in the second mounting position is such that the locking frame 52 can be moved relative to the inlet part 51 by sufficient force acting on the locking frame 52. In this respect, the locking frame 52 can be moved from its first mounting position to the second mounting position with sufficient force, and in reverse, the locking frame 52 can also be moved back from the second mounting position to the first mounting position in order to release the inlet part 51 from the housing part 50 once again if necessary.

When the locking frame 52 is transferred from the first mounting position to the second mounting position, the locking frame 52 with stop elements 521 projecting from the body element 520 is brought closer to a stop contour 518 formed by a circumferential collar of the inlet housing 514 in such a manner that, in the second mounting position, the stop elements 521 rest against the stop contour 518. The locking frame 52 thus cannot be moved beyond the second mounting position in the mounting direction M3 to the inlet part 51 so that the stop elements 521 together with the stop contour 518 define the second mounting position.

In the second mounting position, the body element 520 of the locking frame 52 comes to rest with a circumferential locking section 524 projecting inward relative to the edge section 525 at the rear of the latching elements 502 of the housing part 50, as shown in FIG. 8A and the enlarged view in FIG. 8B, so that an elastic deflection of the latching elements 502 relative to the inlet part 51 outward is blocked by the locking frame 52. The positive-locking connection between the inlet part 51 and the housing part 50 is thus secured.

Given that the positive-locking connection of the inlet part 51 to the housing part 50 is secured by the locking frame 52 through the engagement of the latching elements 502 in the respectively assigned latching device 517, the inlet part 51 is firmly and reliably connected to the housing part 50 and, in particular, cannot be released from the housing part 50 without further action, at least not without releasing the locking frame 52.

The connection of the inlet part 51 to the housing part 50 can be carried out in a standardized manner in a standardized mounting process, and is especially independent of the specific design of the housing part 50 so that a uniform interface can be created for connecting a uniform inlet part 51 to housing parts 50 that are designed completely differently.

When the inlet part 51 is attached to the housing part 50, the assembly thus created can be mounted on the vehicle 4, in particular a vehicle body section, so that the plug connector part 5 is fixed to the vehicle 4.

Contact elements 512, 513 can be arranged on the plug sections 510, 511 of the inlet part 51 before mounting the inlet part 51 on the housing part 50. However, it is also conceivable to arrange the contact elements 512, 513 on the plug sections 510, 511 only after mounting the inlet part 51 on the housing part 50. In addition, an electrical cable can be connected to the inlet part 51 for electrical contacting of the contact elements 512, 513 before or after mounting the inlet part 51 on the housing part 50.

If the inlet part 51 is to be released from the housing part 50, the locking frame 52 is first moved against the mounting direction M3 (see FIG. 8) to the inlet part 51 so that the latching elements 522 are disengaged from the latching inserts 519 and brought into engagement with the latching inserts 516 arranged above them on both sides of the inlet housing 514 of the inlet part 51. The locking frame 51 thus reaches the position shown in FIG. 7A with respect to the inlet part 51 and the housing part 50, in which position the latching elements 502 of the housing part 50 are no longer locked by the locking section 524 of the locking frame 52 so that, by releasing the positive connection between the latching elements 502 and the assigned latching devices 517 counter to the mounting direction M2, the inlet part 51 can be removed from the opening 500 of the housing part 50 (corresponding to the transition from FIG. 5 to FIG. 4).

The idea behind the invention is not limited to the exemplary embodiments described above but can also be realized in a completely different manner.

A plug connector part of the type described can implement a charging socket on an electric vehicle but can also, for example, form a charging plug connected to a charging station via a charging cable.

In addition, such a plug connector part can also be used to charge an electric vehicle independently of a charging system.

Load currents in the form of direct current or in the form of alternating current can be transferred via such a plug connector part.

The inlet part and the housing part of the plug connector part can be designed completely differently. In this respect, the inlet part and the housing part in particular are not limited to the specific embodiments shown.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Charging station
2 Charging cable
200, 201 End
3 Mating plug connector part (charging plug)
4 Vehicle
5 Plug connector part (charging socket)
50 Housing part
500 Receiving opening
501 Bottom section
502 Latching element
51 Inlet part
510, 511 Plug section
512, 513 Contact element
514 Inlet housing
515 Housing section
516 Latching insert
517 Latching device
518 Stop contour
519 Latching insert
52 Locking frame
520 Body element
521 Stop element
522 Latching element
523 Actuating element
524 Locking section
525 Edge section
E Plug-in direction
M1, M2, M3 Mounting direction

What is claimed is:

1. A plug connector part for connecting to a mating plug connector part, comprising:
   a housing part;
   an inlet part that is connectable to the housing part, the inlet part having a plug section on which at least one contact element is arrangeable for a plug-in connection to the mating plug connector part; and
   a locking frame having at least one first latching element, the locking frame being latched in a first mounting position to the inlet part via the at least one first latching element in order to attach the inlet part together with the locking frame to the housing part,
   wherein the inlet part in a position attached to the housing part is connected in a positive-locking manner to the housing part via at least one second latching element,
   wherein the locking frame is movable from the first mounting position relative to the inlet part to a second mounting position in order to act on the at least one second latching element in the position of the inlet part attached to the housing part such that the positive-locking connection between the inlet part and the housing part is secured against releasing in the second mounting position of the locking frame,
   wherein the locking frame is attachable to the inlet part in a first mounting direction in order to latch the locking frame to the inlet part in the first mounting position, and
   wherein the locking frame is movable from the first mounting position in a second mounting direction opposite to the first mounting direction relative to the inlet part in order to transfer the locking frame to the second mounting position.

2. The plug connector part according to claim 1, wherein the at least one second latching element is deflectable elastically when the inlet part is attached together with the locking frame to the housing part, in order to establish the positive-locking connection between the inlet part and the housing part.

3. The plug connector part according to claim 1, wherein the locking frame comprises a body element on which the at least one first latching element is arranged and which extends circumferentially around the inlet part at least in sections.

4. The plug connector part according to claim 3, wherein the body element is configured to act on the at least one second latching element in the second mounting position of the locking frame in order to secure the positive-locking connection between the inlet part and the housing part.

5. The plug connector part according to claim 1, wherein the at least one second latching element is arranged on the housing part and is configured to establish, in a position of the inlet part attached to the housing part, a positive connection with a latching device of the inlet part.

6. The plug connector part according to claim 5, wherein, in the second mounting position, the locking frame is configured to act on the at least one second latching element such that the positive connection between the at least one second latching element and the latching device cannot be released.

7. The plug connector part according to claim 1, wherein the locking frame comprises at least one stop element and the inlet part comprises a stop contour,
wherein the at least one stop element of the locking frame in the second mounting position rests against the stop contour of the inlet part such that the locking frame cannot be moved beyond the second mounting position to the inlet part when it is transferred to the second mounting position.

8. The plug connector part according to claim 1, wherein the at least one first latching element is engaged in a latching manner in the first mounting position with a first latching insert of the inlet part and engaged in a latching manner in the second mounting position with a second latching insert of the inlet part.

9. The plug connector part according to claim 1, wherein the housing part comprises a receiving opening into which the inlet part is insertable in order to connect to the housing part.

10. The plug connector part according to claim 9, wherein the inlet part is insertable into the receiving opening on a first side of the housing part such that the plug section is connectable by mating with an assigned mating plug connector part on a second side of the housing part.

11. A charging system for charging an electric vehicle, comprising:
the plug connector part according to claim 1.

12. A method for mounting a plug connector part for connecting to a mating plug connector part, comprising:
connecting an inlet part, which has a plug section on which at least one contact element is arrangeable for a plug-in connection to the mating plug connector part, to a housing part, the connecting comprising:
attaching the inlet part to the housing part together with a locking frame, which has at least one first latching element and is latched to the inlet part in a first mounting position via the at least one first latching element, such that the inlet part, in a position attached to the housing part, is connected in a positive-locking manner to the housing part via at least one second latching element, and
then moving the locking frame from the first mounting position relative to the inlet part to a second mounting position so that the locking frame acts on the at least one second latching element in the position of the inlet part attached to the housing part such that the positive-locking connection between the inlet part and the housing part is secured against releasing in the second mounting position of the locking frame,
wherein the locking frame is attachable to the inlet part in a first mounting direction in order to latch the locking frame to the inlet part in the first mounting position, and
wherein the locking frame is movable from the first mounting position in a second mounting direction opposite to the first mounting direction relative to the inlet part in order to transfer the locking frame to the second mounting position.

13. A plug connector part for connecting to a mating plug connector part, comprising:
a housing part;
an inlet part that is connectable to the housing part, the inlet part having a plug section on which at least one contact element is arrangeable for a plug-in connection to the mating plug connector part; and
a locking frame having at least one first latching element, the locking frame being latched in a first mounting position to the inlet part via the at least one first latching element in order to attach the inlet part together with the locking frame to the housing part,
wherein the inlet part in a position attached to the housing part is connected in a positive-locking manner to the housing part via at least one second latching element,
wherein the locking frame is movable from the first mounting position relative to the inlet part to a second mounting position in order to act on the at least one second latching element in the position of the inlet part attached to the housing part such that the positive-locking connection between the inlet part and the housing part is secured against releasing in the second mounting position of the locking frame, and
wherein the locking frame comprises a body element on which the at least one first latching element is arranged and which extends circumferentially around the inlet part at least in sections.

14. The plug connector part according to claim 13, wherein the body element is configured to act on the at least one second latching element in the second mounting position of the locking frame in order to secure the positive-locking connection between the inlet part and the housing part.

* * * * *